(No Model.)
J. S. COPELAND.
WHEEL TIRE.
No. 551,075. Patented Dec. 10, 1895.
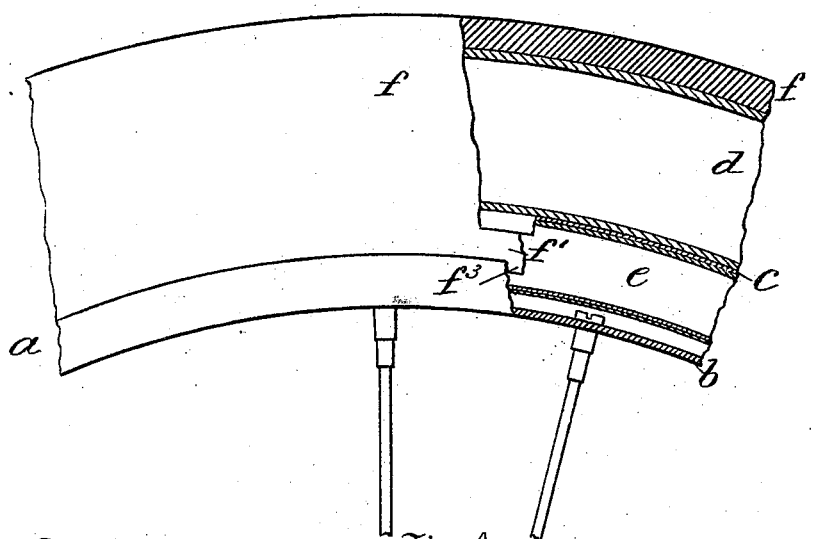
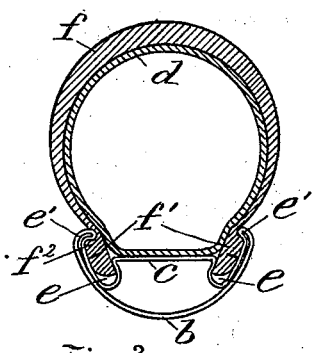
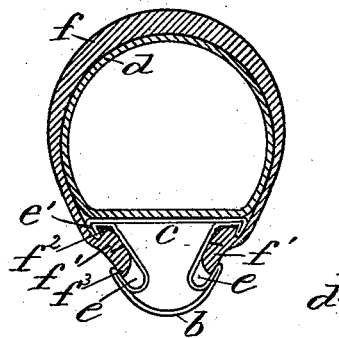
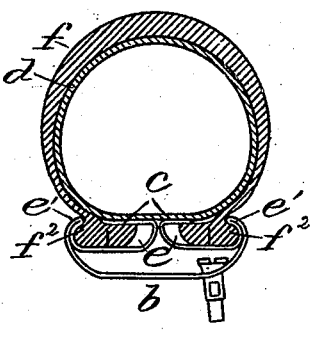
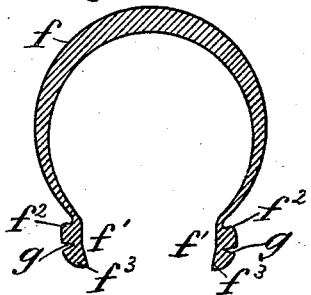
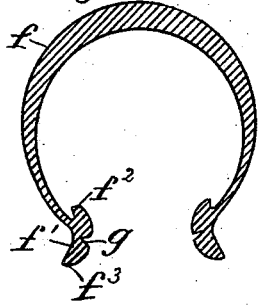
Witnesses:
Joseph Arthur Cantin
Emory C. Whitney
Inventor:
James S. Copeland
by Chas. L. Burdett
Attorney.

UNITED STATES PATENT OFFICE.

JAMES S. COPELAND, OF HARTFORD, CONNECTICUT, ASSIGNOR TO THE POPE MANUFACTURING COMPANY, OF BOSTON, MASSACHUSETTS.

WHEEL-TIRE.

SPECIFICATION forming part of Letters Patent No. 551,075, dated December 10, 1895.

Application filed April 8, 1893. Serial No. 469,557. (No model.)

*To all whom it may concern:*

Be it known that I, JAMES S. COPELAND, of Hartford, in the county of Hartford and State of Connecticut, have invented certain new and useful Improvements in Wheel-Tires, of which the following is a full, clear, and exact description, whereby any one skilled in the art can make and use the same.

The object of my invention is to provide means whereby the flexible outer part of a fluid-filled or pneumatic tire may be removably secured to the rim of a wheel, the device in the form of the invention, as herein illustrated and described, being more particularly adapted and intended for use on the wheels of bicycles and like vehicles.

To this end my invention consists in the details of the several parts of the tire and rim and in their combination, as more particularly hereinafter described, and pointed out in the claims.

Referring to the drawings, Figure 1 is a detail view in side elevation of a part of the rim and tire of a wheel embodying my invention with parts broken away. Fig. 2 is a detail view in cross-section of the form of tire shown in Fig. 1. Fig. 3 is a detail view in cross-section of the covering-layer of the tire removed from the rim. Fig. 4 is a view in cross-section of a rim and tire, showing a modified form of my invention. Fig. 5 is a view in cross-section of the covering-layer of the form of tire shown in Fig. 4 removed from the rim. Fig. 6 is a view in cross-section of a rim and tire, showing another modified form of my invention.

In the construction of inflated tires for vehicle-wheels in which an inner inflatable tube is used it is desirable to so construct an outer or covering layer for the tire as will render it more durable than the inner tube, and so as to enable it to withstand the wear to which its surface is more immediately subjected by rolling contact with a roadway in the use of such wheels to which the tire is applied. Such an outer or covering layer of a pneumatic tire has been secured to the rim of a wheel in a variety of ways, and I am aware that a wheel-rim with a lengthwise flange, into which the edges of the outer layer are hooked, has been used, and that the edges of the outer covering-layer of the tire, made rigid by an inserted length of metallic wire, have been held in sockets in the rim. My invention differs from such structures mainly for the reasons that the edges of the cover do not require the use of a metallic or other rigid reinforce to render the device effective as a fastening means and that each edge is secured in place and is operative independent of the other.

In the accompanying drawings, the letter $a$ denotes the rim of a wheel which is made in any convenient shape in cross-section that will provide an anchoring part $b$ for the attachment of the spokes, a seat $c$ for the inner tube $d$, and lengthwise sockets $e$ $e$, into which the edges of the covering-layer $f$ may be thrust. In these sockets the edges of the cover $f$ are removably held without the use of supplemental fastening means or anything apart from the peculiar construction of the engaging parts, and the inflation of the tire, as will be hereinafter explained.

The inner tube $d$ may be of any suitable material and shape, and may be provided with the usual form of valve for controlling the inflation of the tube, usually with air.

The covering-layer $f$ is made preferably of a compound of india-rubber or of other flexible and suitable material to withstand the wear and use to which the tread of a wheel is subjected, and which has the properties of elasticity, flexibility, durability, and impermeability to moisture needed in such use. Along each edge of this cover $f$, which is divided lengthwise along its under side or that next to the rim, there is a locking-flange $f'$, which is in each case preferably divided lengthwise on that surface opposite to the one from which the strain upon such flange is thrown by the inflation of the tire and when it is in normal position for use. This flange has a bearing-shoulder $f^2$ and a holding-edge $f^3$, the shoulder being adapted to engage a seat $e'$ in the socket $e$ in the rim of the wheel, while the holding-edge underlies the lip on the opposite side of the mouth of the socket. In each case the socket is longer than the width of the flange, so that the latter has a sliding play within it sufficient to enable the bearing-shoulder to be disengaged from the seat in the socket. The object in dividing the flange or thickened edge of the cover, as by means of a slit or channel $g$, is to render it more pliable in one direction, so that it may be bent and then tucked into the socket after the bearing-shoulder $f^2$ is in place in the socket.

Holding-sockets may be formed along the outer face of the rim, as shown in Figs. 2 and 6, or they may be located along the sides, as shown in Fig. 4.

The several parts making up the tire are assembled with the rim by engaging one edge of the covering-layer in one of the sockets, as by thrusting it into the socket until the bearing-shoulder $f^2$ is engaged with the seat $e'$, the inner tube $d$ is placed on its seat and the other edge of the cover is fastened to the rim in like manner as the first edge was secured by thrusting the holding-edge $f^3$ into the socket, and then by inflating the inner tube cause the locking-shoulder on that edge to engage the seat, the parts being firmly held in place while the inner tube remains inflated.

In case it may be desired to get access to the inner tube, as for the purpose of repairing it after puncture, or to renew it for any purpose, the tire is deflated, and then the cover will be sufficiently slack to enable either of the holding-edges to be disengaged from the socket in the rim by reversing the method by which it was secured in place. This is done by pushing in upon the tire near the edge and causing the flange to slide in the socket until the bearing-shoulder is disengaged from the seat. It can then by a slight manipulation be removed for a sufficient distance along the rim to enable the inner tube to be repaired or taken out.

The covering-layer $f$ is usually reinforced by a textile fabric molded into the material of the cover or secured thereto as by means of rubber cement in the usual way.

The enlargement or thickened flange on the edge of the cover or like part, and having a lengthwise slit or channel therein, has been described, and is referred to in the claims herein as T-shaped; but it is to be understood that any device bearing a thickened edge with a lengthwise slit, by means of which a portion of the edge located on one side of the slit may be bent back in one direction, will come within the scope and intent of the invention.

I claim as my invention—

1. The combination with the rim of a wheel provided with sockets running lengthwise thereof, each socket having a contracted opening, a flexible tire having along each edge a T-shaped flange with a lengthwise channel along that side of the flange facing the bottom of the socket in the rim, all substantially as described.

2. The combination with the rim of a wheel provided with sockets running lengthwise thereof, each socket having a contracted opening, an inner inflatable tube, and a flexible covering layer having thickened edges forming a crosswise flange and having a lengthwise channel along said flange facing the bottom of the socket, all substantially as described.

JAMES S. COPELAND.

Witnesses:
A. G. HEDSTROM,
A. B. JENKINS.